(12) United States Patent
Sekita (10) Patent No.: US 6,943,962 B2
(45) Date of Patent: Sep. 13, 2005

(54) ZOOM LENS SYSTEM

(75) Inventor: Makoto Sekita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/839,145

(22) Filed: May 5, 2004

(65) Prior Publication Data

US 2004/0223231 A1 Nov. 11, 2004

(30) Foreign Application Priority Data

May 6, 2003 (JP) ........................................ 2003-128261

(51) Int. Cl.$^7$ ............................................. G02B 15/14
(52) U.S. Cl. ....................................... 359/689; 359/682
(58) Field of Search ................................ 359/680–682, 359/689

(56) References Cited

U.S. PATENT DOCUMENTS

| | | | |
|---|---|---|---|
| 4,647,160 A | | 3/1987 | Ikemori |
| 4,810,072 A | | 3/1989 | Takahashi |
| 4,838,666 A | | 6/1989 | Shiraishi |
| 5,270,863 A | | 12/1993 | Uzawa |
| 5,278,698 A | | 1/1994 | Iizuka et al. |
| 6,108,136 A | * | 8/2000 | Yamanashi ................... 359/682 |
| 6,351,337 B1 | * | 2/2002 | Tanaka ......................... 359/684 |
| 6,417,973 B2 | | 7/2002 | Mihara et al. |
| 6,542,301 B1 | | 4/2003 | Fujibayashi |
| 6,545,819 B1 | | 4/2003 | Nanba et al. |

FOREIGN PATENT DOCUMENTS

| | | |
|---|---|---|
| JP | 63-135913 | 6/1988 |
| JP | 3-288113 | 12/1991 |
| JP | 6-40170 | 5/1994 |
| JP | 7-3507 | 1/1995 |
| JP | 7-261083 | 10/1995 |
| JP | 3035830 | 2/2000 |
| JP | 2000-47108 | 2/2000 |
| JP | 2001-272602 | 10/2001 |
| JP | 2002-14284 | 1/2002 |
| JP | 2002-48975 | 2/2002 |

OTHER PUBLICATIONS

English Abstract for Japanese Patent Application Laid Open No. 2002–48975.
English Abstract for Japanese Patent Application Laid Open No. 2002–14284.
English Abstract for Japanese Patent Application Laid Open No. 2001–272602.
English Abstract for Japanese Patent Application Laid Open No. 2000–47108.
English Abstract for Japanese Patent Application Laid Open No. 7–261083.
English Abstract for Japanese Patent Application Laid Open No. 3–288113.
English Abstract for Japanese Patent Application Laid Open No. 63–135913.

* cited by examiner

*Primary Examiner*—Georgia Epps
*Assistant Examiner*—William Choi
(74) *Attorney, Agent, or Firm*—Morgan & Finnegan, LLP (57) ABSTRACT

A zoom lens system is disclosed which includes a first lens unit with negative optical power, a second lens element with positive optical power, and a third lens element with positive optical power, arranged in that order from an object side to an image side. The zoom lens system performs zooming by changing distances between the lens units. By configuring the first lens unit of a meniscus-shaped negative lens element whose convex surface faces the object side and a positive lens element, and by setting the refractive indices of the lens elements to appropriate values, a zoom lens system is realized, which has a small number of constituent lenses, which is compact and which has an excellent optical performance.

11 Claims, 9 Drawing Sheets

ZOOM LENS SYSTEM

BACKGROUND OF THE INVENTION

1. Field of the Invention

The present invention relates to zoom lens systems, which are suitable for film cameras, video cameras or digital still cameras and the like.

2. Description of the Related Art

Recently, as the functionality of image-taking apparatuses (cameras), such as video cameras, digital still cameras or the like using a solid-state image-pickup element advances, zoom lenses having a large aperture ratio containing a broad field angle are desired for the optical systems used for such image-pickup apparatuses.

In this type of camera, various optical members such as a low-pass filter or a color correction filter are arranged between the rear end of the lens system and the image-pickup element, so that a lens system with a relatively long back focus is desired for the optical system used in such cameras. Furthermore, in the case of cameras using an image-pickup element for color images, a lens system with good telecentricity on the image side is desirable for the optical system used in such cameras, in order to avoid color shading.

Conventionally, various dual-unit zoom lenses also known as short-zoom wide-angle lenses have been proposed that are made of two lens units, namely a first lens unit having negative refractive power and a second lens unit having positive refractive power, and perform zooming by changing the distance between those two lenses. With such short zoom optical systems, zooming is performed by moving the second lens unit with positive refractive power, and the correction of the image position in the course of zooming is performed by moving the first lens unit with negative refractive power. In such lens structures made of two lens units, the zoom ratio is about 2×.

To achieve a lens system of an overall compact form having a zoom ratio greater than 2×, a so-called triple-unit zoom lens has been proposed in which a third lens unit having negative or positive refractive power is arranged on the image side of the dual-unit zoom lens, and various aberrations occurring with higher zoom ratios are corrected (see Japanese Patent Publication No. H07 (1995)-3507 (corresponds to U.S. Pat. No. 4,810,072) and Japanese Patent Publication No. H06 (1994)-40170 (corresponds to U.S. Pat. No. 4,647,160) for example).

Moreover, wide-angle triple-unit zoom lens systems are known that satisfy the requirements for back focus and telecentricity (see Japanese Patent Application Laid Open No. S63 (1988)-135913 (corresponds to U.S. Pat. No. 4,838,666) and Japanese Patent Application Laid Open No. H07 (1995)-261083 for example).

Furthermore, triple-unit zoom lenses are known, in which the first lens unit, which has negative refractive power, is immovable when zooming, and which perform zooming by moving the second lens unit, which has positive refractive power, and the third lens unit, which has positive refractive power (see Japanese Patent Application Laid Open No. H03 (1991)-288113 (corresponds to U.S. Pat. No. 5,270,863) for example).

Further known are triple-unit zoom lenses in which the number of constituent lenses is relatively small (see Japanese Patent Application Laid Open No. 2000-47108 (corresponds to U.S. Pat. No. 6,542,301), Japanese Patent Application Laid Open No. 2001-272602 (corresponds to U.S. Pat. No. 6,545,819), Japanese Patent Application Laid Open No. 2002-14284, Japanese Patent Application Laid Open No. 2002-48975 (corresponds to U.S. Pat. No. 6,417,973), Japanese Patent No. 3035830 (corresponds to U.S. Pat. No. 5,270,863), and U.S. Pat. No. 5,278,698 for example).

Among these conventional examples, Japanese Patent Application Laid Open No. 2000-47108, Japanese Patent No. 3035830 and U.S. Pat. No. 5,278,698 disclose that the first lens unit is configured by two lenses, namely a negative lens and a positive lens, that the refractive index of the material of the negative lens and the positive lens is kept relatively low, thereby achieving both the correction of chromatic aberration and image plane correction.

In triple-unit zoom lenses that are designed for 35 mm films, the back focus is long and their telecentricity is not very good, so that it is difficult to use them directly in optical apparatuses having solid-state image-pickup elements.

In recent years, in order to make cameras more compact while at the same time increasing the zoom ratio of the zoom lens, so-called collapsible zoom lenses are widely used, in which the distance between the lens units when not image-taking is contracted to a distance that is different of the distance when image-taking, and in which the lens protrudes from the camera main body only by a small amount.

Ordinarily, when the number of lenses of each lens unit constituting the zoom lens is large, the length of the lens unit on the optical axis becomes long, and when the amount that each lens unit is moved during zooming and focusing is large, then the overall length of the lens system becomes large and the desired collapsed length cannot be achieved, making it difficult to use a lens system for a collapsible zoom lens.

SUMMARY OF THE INVENTION

The present invention relates to novel zoom lens systems which are different from the above-described conventional examples, and it is an object of the present invention to realize a zoom lens system, which has a small number of constituent lenses, which is compact and which has an excellent optical performance.

According to one aspect of the present invention, a zoom lens system which comprises a first lens unit having a negative optical power, a second lens unit having a positive optical power, and a third lens unit having a positive optical power, arranged in that order from an object side to an image side. The zoom lens system performs zooming by changing a distance between the first lens unit and the second lens unit as well as a distance between the second lens unit and the third lens unit. By configuring the first lens unit of a meniscus-shaped negative lens element whose convex surface faces the object side and a positive lens element, and by setting the refractive indices of the lens elements to appropriate values, the above-stated object is achieved.

These and further objects and features of the zoom lens system according to the present invention will become apparent from the following detailed description of preferred embodiments thereof taken in conjunction with the accompanying drawings.

DETAILED DESCRIPTION OF THE PREFERRED EMBODIMENTS

Referring to the accompanying drawings, the following is a description of embodiments of a zoom lens system according to the present invention and of an optical apparatus (digital still camera) using the zoom lens system.

Figure 1:
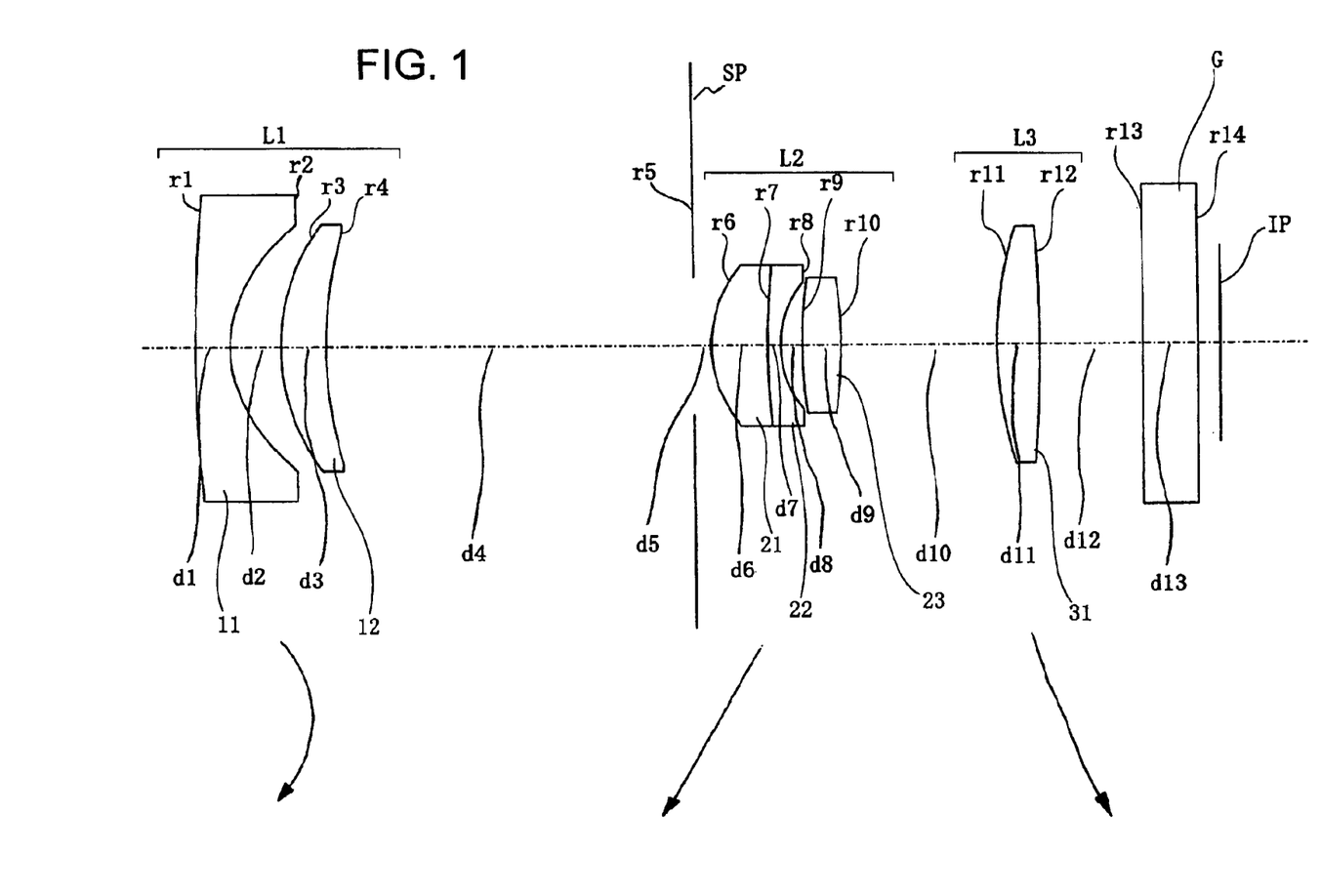
FIG. 1 is a cross-sectional view of a zoom lens according to Embodiment 1.
Figure 2:
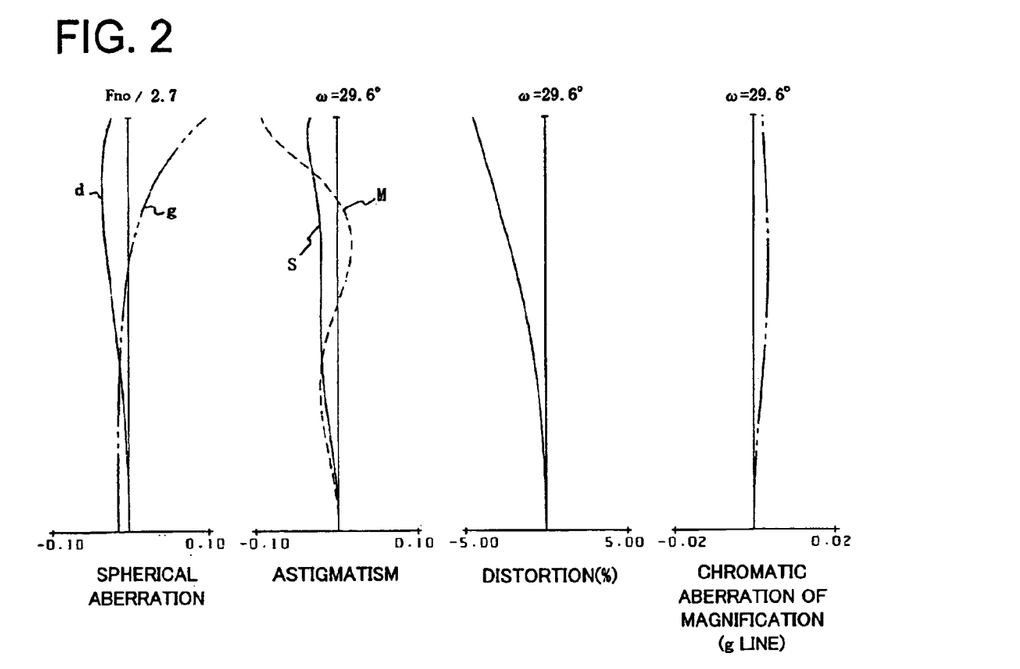
FIG. 2 shows various types of aberration in the zoom lens of Embodiment 1 at the wide-angle end.
Figure 3:
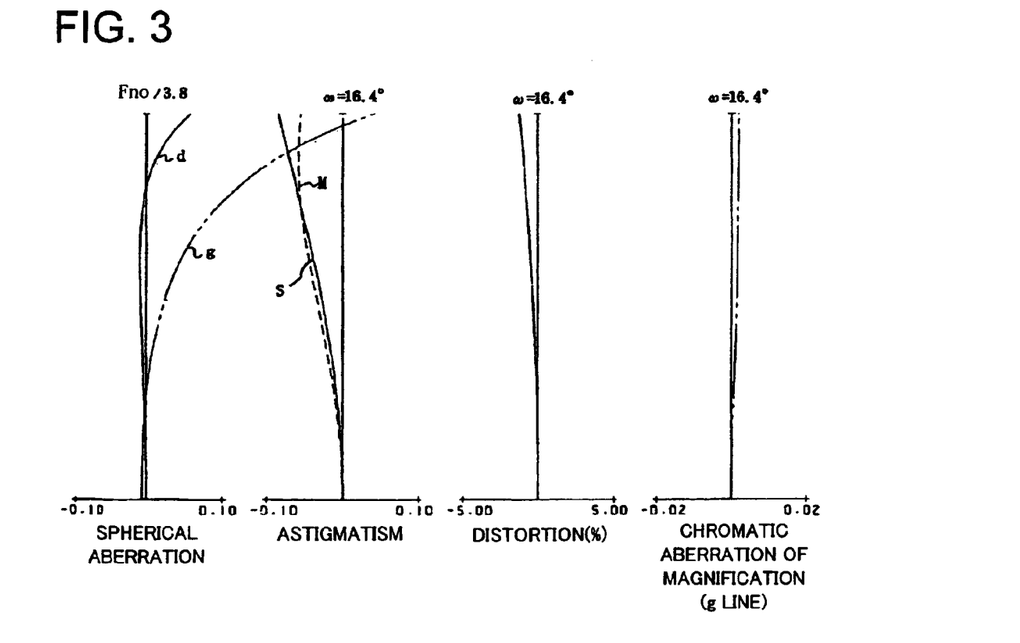
FIG. 3 shows various types of aberration in the zoom lens of Embodiment 1 at an intermediate zoom position.
Figure 4:
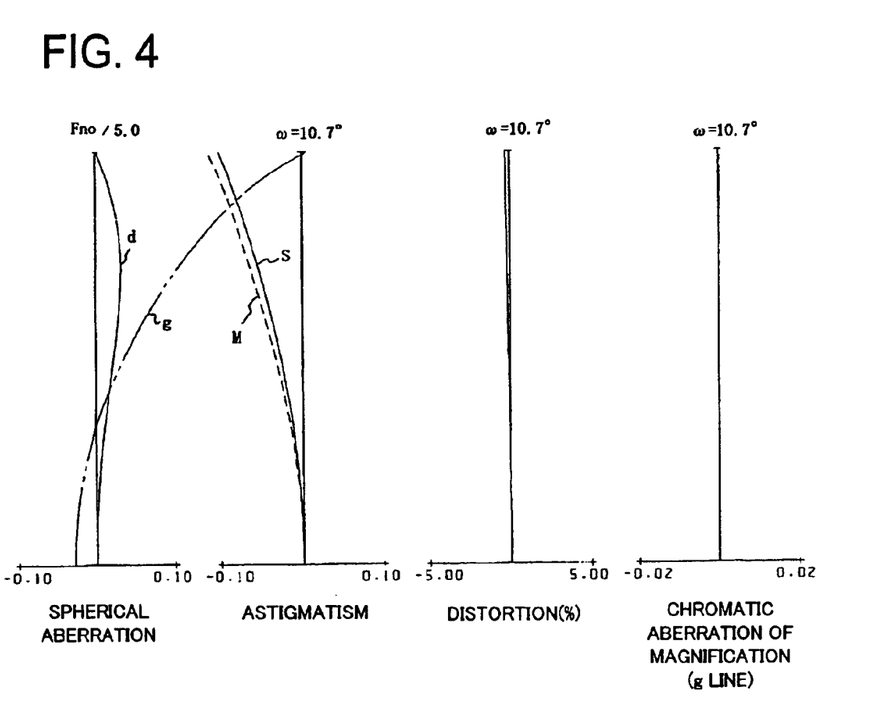
FIG. 4 shows various types of aberration in the zoom lens of Embodiment 1 at the telephoto end.

FIG. 1 is a cross-sectional view of a zoom lens according to Embodiment 1 at the wide-angle end. FIGS. 2 to 4 show various types of aberration in the zoom lens of Embodiment 1 at the wide-angle end, an intermediate zoom position and the telephoto end, respectively. In Embodiment 1, the zoom lens has a zoom ratio of 3.0× and an F number of about 2.7 to 5.0.

Figure 5:
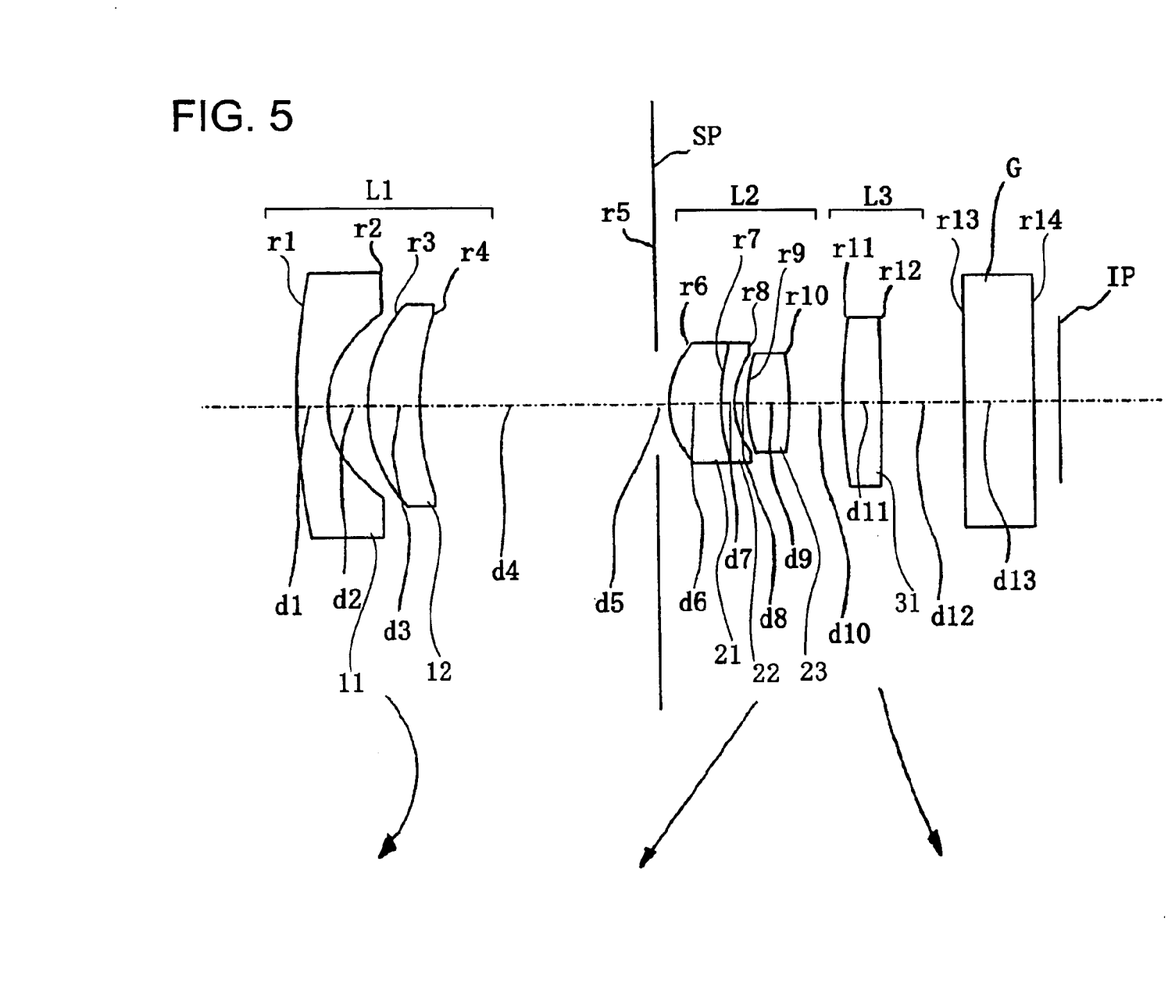
FIG. 5 is a cross-sectional view of a zoom lens according to Embodiment 2.
Figure 6:
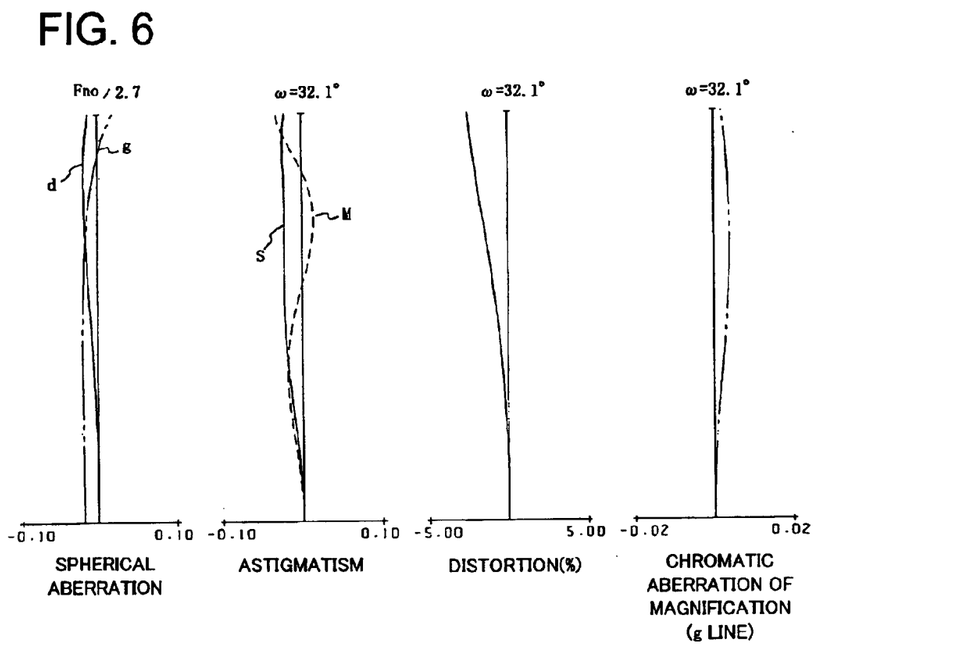
FIG. 6 shows various types of aberration in the zoom lens of Embodiment 2 at the wide-angle end.
Figure 7:
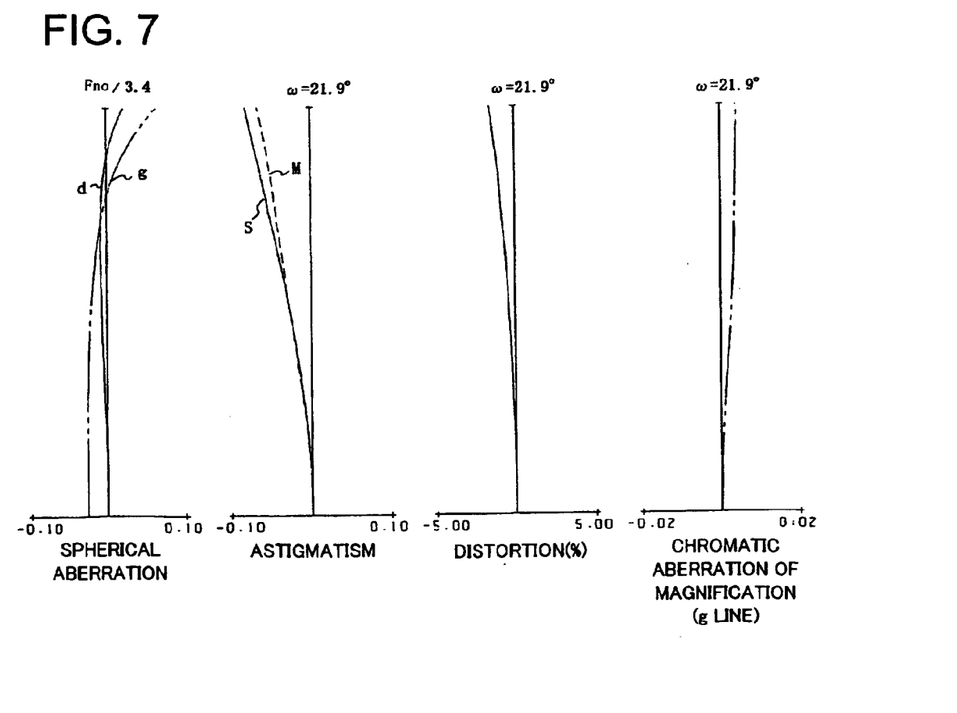
FIG. 7 shows various types of aberration in the zoom lens of Embodiment 2 at an intermediate zoom position.
Figure 8:
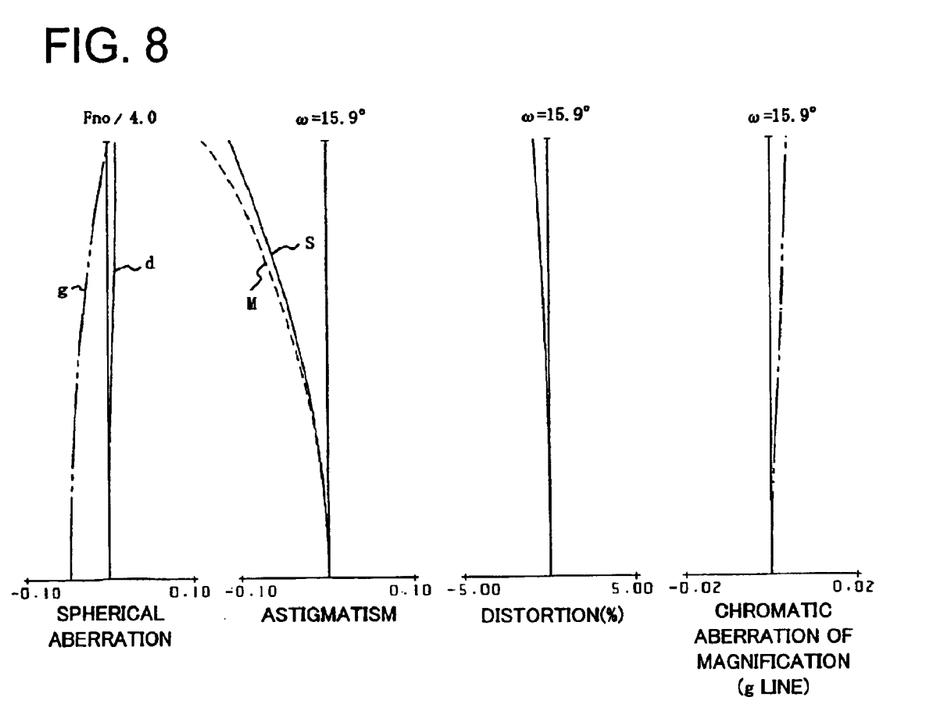
FIG. 8 shows various types of aberration in the zoom lens of Embodiment 2 at the telephoto end.

FIG. 5 is a cross-sectional view of a zoom lens according to Embodiment 2 at the wide-angle end. FIGS. 6 to 8 show various types of aberration in the zoom lens of Embodiment 2 at the wide-angle end, an intermediate zoom position and the telephoto end, respectively. In Embodiment 2, the zoom lens has a zoom ratio of 2.2× and an F number of about 2.7 to 4.0.

Figure 9:
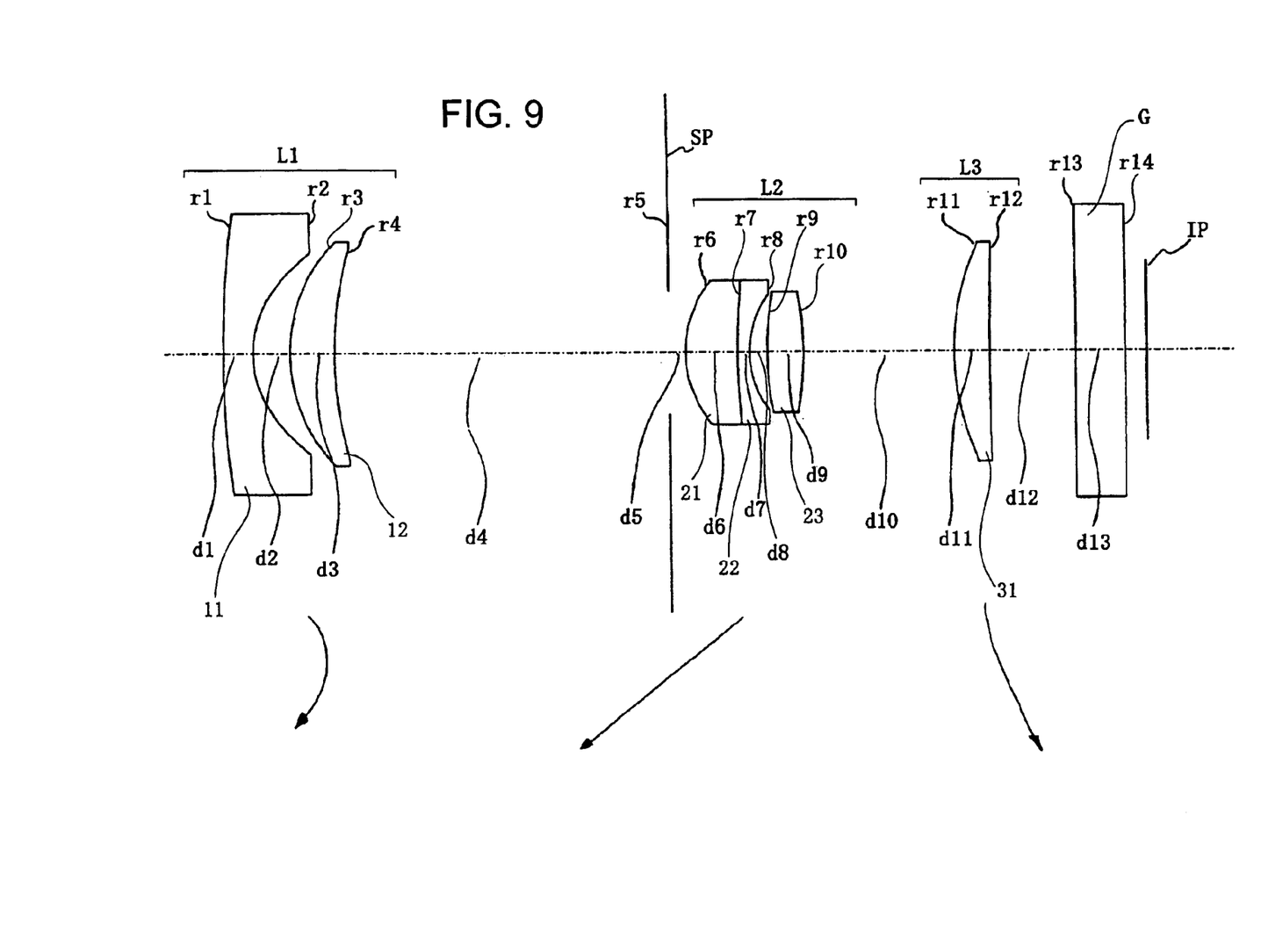
FIG. 9 is a cross-sectional view of a zoom lens according to Embodiment 3.
Figure 10:
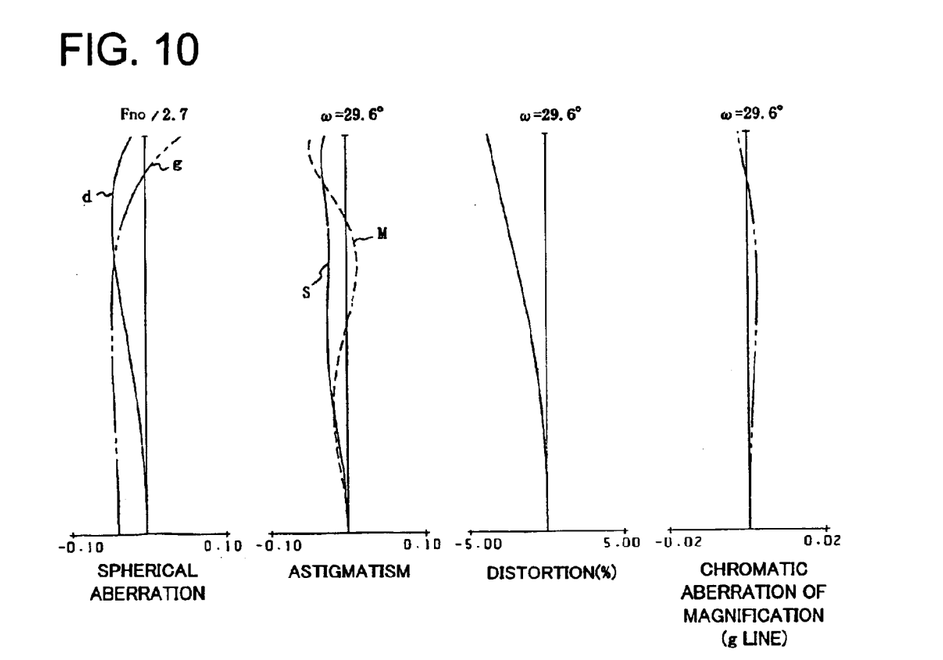
FIG. 10 shows various types of aberration in the zoom lens of Embodiment 3 at the wide-angle end.
Figure 11:
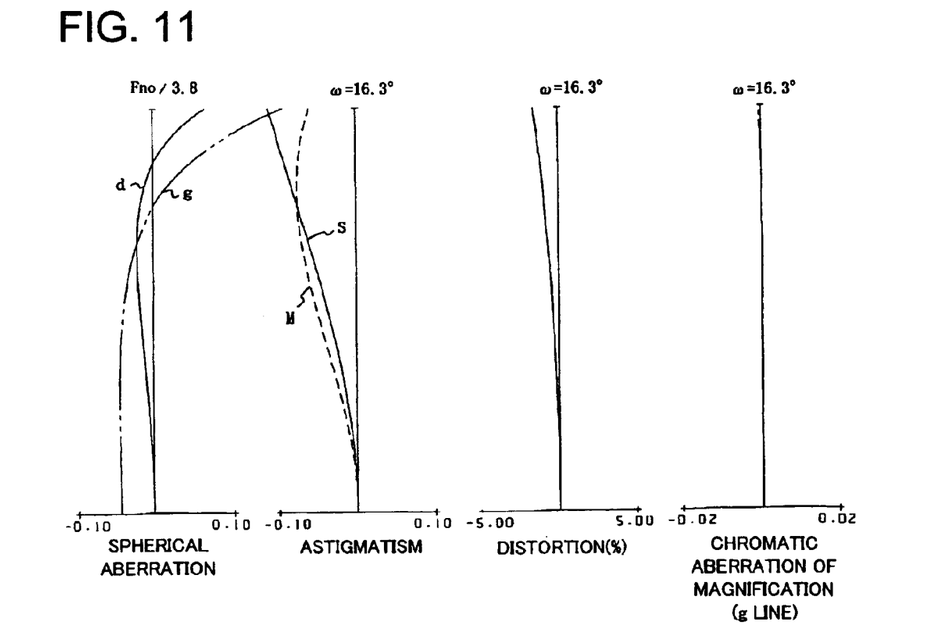
FIG. 11 shows various types of aberration in the zoom lens of Embodiment 3 at an intermediate zoom position.
Figure 12:
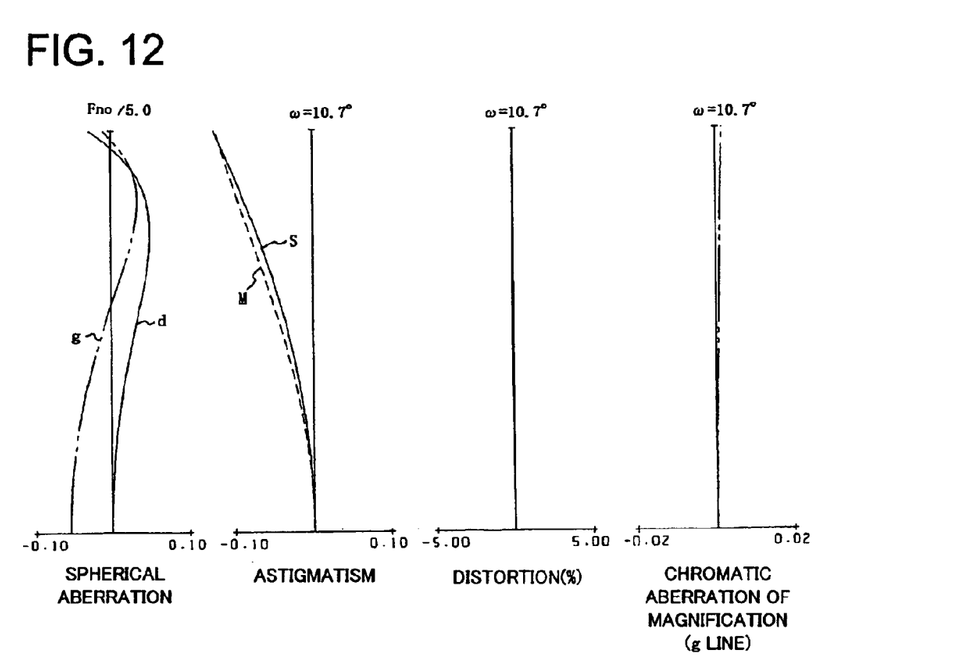
FIG. 12 shows various types of aberration in the zoom lens of Embodiment 3 at the telephoto end.

FIG. 9 is a cross-sectional view of a zoom lens according to Embodiment 3 at the wide-angle end. FIGS. 10 to 12 show various types of aberration in the zoom lens of Embodiment 3 at the wide-angle end, an intermediate zoom position and the telephoto end, respectively. In Embodiment 3, the zoom lens has a zoom ratio of 3.0× and an F number of about 2.7 to 5.0.

In the lens cross sections of FIGS. 1, 5 and 9, L1 denotes a first lens unit having negative refractive power (that is, an optical power which is the inverse of a focal length), L2 denotes a second lens unit having positive refractive power, L3 denotes a third lens unit having positive refractive power, and SP denotes an aperture stop. IP denotes the image plane, at which the image-sensing surface of a solid-state image-pickup element, such as a CCD sensor or CMOS sensor, is arranged. G denotes a glass block, such as a quartz low-pass filter or an infrared cut filter.

The zoom lenses according to these embodiments include three lens units, namely a first lens unit L1 with negative refractive power, a second lens unit L2 with positive refractive power and a third lens unit L3 with positive refractive power, arranged in that order from the object side. During zooming from the wide-angle end to the telephoto end, the first lens unit L1 is moved substantially reciprocatingly along a part of a track which is convex toward the image side, the second lens unit L2 is moved toward the object side, and the third lens unit L3 is moved monotonously or with an inflection point toward the image side.

In these embodiments, the main zooming is performed due to the movement of the second lens unit L2, whereas the shift in the image position during the zooming is corrected by the substantially reciprocating movement of the first lens unit L1 and the movement of the third lens unit L3 toward the image side.

The third lens unit L3 is responsible for the increase of the refractive power of the overall lens system that goes hand in hand with making the image-pickup element smaller, and by reducing the refractive power of the short zoom system constituted by the first lens unit L1 and the second lens unit L2, the occurrence of aberrations with the lenses constituting the first lens unit L1 in particular is suppressed, and a favorable optical performance is achieved. Moreover, telecentric image formation to the image side, which is particularly necessary in image-taking apparatuses using a solid-state image-pickup element, is achieved by letting the third lens unit L3 act as the field lens.

Moreover, an increase in diameter of the lenses constituting the first lens unit L1 is suppressed by arranging the aperture stop SP on the object side of the second lens unit L2, and decreasing the distance between the first lens unit L1 and the entrance pupil at the wide-angle side. Furthermore, a favorable optical performance without increasing the number of constituent lenses is obtained by canceling off-axis aberrations with the first lens unit L1 and the third lens unit L3 flanking the aperture stop SP.

In these embodiments, the first lens unit L1 with negative refractive power is made of two lenses, namely a meniscus-shaped negative lens 11 whose convex surface faces the object side and a meniscus-shaped positive lens 12 whose convex surface also faces the object side, arranged in that order from the object side to the image side.

The second lens unit L2 is made of two positive lenses and at least one negative lens, the two positive lenses being arranged closest to the object side and closest to the image side of the second lens unit L2.

More specifically, the second lens unit L2 with positive refractive power is made of three lenses, namely a meniscus-shaped positive lens 21 whose convex surface faces the object side, a meniscus-shaped negative lens 22 whose concave surface faces the image side, and a positive lens 23 whose two lens surfaces are convex, arranged in that order from the object side to the image side.

At least one surface of the negative lens of the first lens unit L1 and the surface of the second lens unit L2 that is closest to the object side are aspheric surfaces.

The third lens unit L3 with positive refractive power is made of one positive lens 31.

As describe above, by providing each of the lens units with a lens structure with which both the desired distribution of refractive power as well as correction of aberrations is accomplished, a more compact lens system is achieved while preserving a favorable optical performance.

The following is a more detailed description of the lens structure of each of the lens units.

The first lens unit L1 has the role of forming a pupil image by guiding the off-axis principal light rays onto the center of the aperture stop SP, and in particular in the zoom region on the wide-angle side, the off-axis principal rays are refracted by a large amount, so that off-axis aberrations, particularly astigmatism and distortion aberration tend to occur.

In these embodiments, the first lens unit L1 is configured of a negative lens and a positive lens with which an increase in the diameter of the lens that is closest to the object side is suppressed, as in an ordinary image-taking lens for wide field angles.

By devising the image-side lens surface of the meniscus-shaped negative lens 11 as an aspheric surface whose shape weakens the negative refractive power at the lens periphery, astigmatism and distortion aberration can be corrected with good balance. The first lens unit L1 is configured with only two lenses, so that the overall lens system can be made more compact.

The lenses constituting the first lens unit L1 have lens shapes that are close to concentric spherical surfaces with the point where the aperture stop SP intersects with the optical axis as the center, in order to suppress the occurrence of off-axis aberrations that occur due to refraction of off-axis principal rays.

Next, the meniscus-shaped positive lens 21 whose convex surface faces the object side is arranged in the second lens unit 2, and the lens shape is made such that the refractive angle of the off-axis principal rays emerging from the first lens unit L1 is small, and the occurrence of off-axis aberrations is repressed.

The positive lens 21 is the lens where the height passed by on-axial rays is highest, and it is a lens that contributes mainly to the correction of spherical aberration and coma aberration.

Moreover, spherical aberration and coma aberration can be favorably corrected by devising the object-side lens surface of the positive lens 21 as an aspheric surface whose shape weakens the positive refractive power at the lens periphery Next, by devising the lens shape of the negative lens 22, which is cemented to the positive lens 21, as a meniscus shape whose concave surface faces the image plane side, aberrations occurring at the object-side lens surface of the positive lens 21 are cancelled.

Next, the third lens unit L3 is made of a positive lens 31 whose two lens surfaces are convex, and serves as a field lens for ensuring image-side telecentricity.

If the back focus is sk', the focal length of the third lens unit L3 is f3, and the image-forming magnification of the third lens unit L3 is β3, then the following conditional expression is satisfied:

$$sk'=f3(1-\beta3)$$

wherein $$0<\beta3<1.0$$

Here, when the third lens unit L3 is moved to the image side while zooming from the wide-angle end to the telephoto end, then the back focus sk' is reduced, and the image-forming magnification β3 of the third lens unit L3 is increased on the telephoto side.

Thus, the third lens unit L3 ultimately can take on some of the zooming, the movement amount of the second lens unit L2 is reduced, and as a result it is possible to save space, which contributes to making the lens system smaller.

In these embodiments, during focusing from an object at infinity to an object at close distance, a favorable optical performance is obtained by moving the first lens unit L1 to the object side, but it is also possible to perform the focusing by moving the third lens unit L3 to the image side.

This way, it is possible to repress an increase in the diameter of the frontmost lens and an increase in the load of the actuator due to the movement of the first lens unit L1 whose lens weight is heaviest, which occurs during focusing with the first lens unit L1, which is arranged closest to the object side, and it is furthermore possible to couple the first lens unit L1 and the second lens unit L2 with a simple structure, such as a cam, to move them during zooming, thus achieving a simpler mechanical structure and higher precision.

Moreover, when focusing is performed with the third lens unit L3, the movement amount of the third lens unit L3 at the telephoto end is larger than that at the wide-angle end. In these embodiments, by moving the third lens unit L3 to the image side during zooming from the wide-angle end to the telephoto end, at the telephoto end, the third lens unit L3 is positioned farther on the image plane side than at the wide-angle end to ensure a movement space for the third lens unit L3 during focusing at the telephoto end. Thereby, it is possible to use the space between the second lens unit L2 and the third lens unit L3 more efficiently to achieve a miniaturization of the lens system.

The following is an explanation of other characteristics of the present embodiments.

When n1n represents the refractive index of the material of the negative lens and n1p represents the refractive index of the material of the positive lens in the first lens unit L1, then the following conditional expressions are satisfied:

$$1.60<n1n<1.75 \tag{1}$$

$$1.65<n1p<1.80 \tag{2}$$

If n1n is greater than the upper limit of Conditional Expression (1) or n1p is smaller than the lower limit of Conditional Expression (2), then the Petzval sum of the first lens unit L1 increases in positive direction, and the correction of the image surface curvature becomes difficult. Moreover, if n1n is smaller than the lower limit of Conditional Expression (1) or n1p is greater than the upper limit of Conditional Expression (2), then the distortion aberration and magnification chromatic aberration when the zoom is positioned at the wide angle end become difficult to correct, which is not preferable.

Even more preferably, the numerical range of the Conditional Expressions (1) and (2) may be set as follows:

$$1.65<n1n<1.70 \tag{1a}$$

$$1.68<n1p<1.78 \tag{2a}$$

When f1 represents the focal length of the first lens unit L1 and fw represents the focal length of the entire system at the wide-angle end, then the following conditional expression is satisfied:

$$-2.7<f1/fw<-1.6 \tag{3}$$

If f1/fw is greater than the upper limit of Conditional Expression (3), then the total length of the optical system becomes short, but also the focal length of the first lens unit L1 becomes short, so that it becomes difficult to correct aberrations, in particular to correct distortion aberrations, over the entire zoom region, which is not preferable. Moreover, if f1/fw is smaller than the lower limit of Conditional Expression (3), then the movement amount of the first lens unit L1 during zooming is increased, and the total length of the optical system becomes longer, which is not preferable.

Even more preferably, the numerical range of the Conditional Expression (3) may be set as follows:

$$-2.5 < f1/fw < -1.8 \quad (3a)$$

When f2 represents the focal length of the second lens unit L2 and fw represents the focal length of the entire system at the wide-angle end, then the following conditional expression is satisfied:

$$1.5 < f2/fw < 2.2 \quad (4)$$

If f2/fw is greater than the upper limit of Conditional Expression (4), then the movement amount of the second lens unit L2 during zooming increases, and the total length of the optical system becomes longer, which is not preferable. And if f2/fw is smaller than the lower limit of Conditional Expression (4), then the total length of the optical system becomes short, but also the focal length of the second lens unit L2 becomes short, so that it becomes difficult to correct aberrations over the entire zoom region, which is not preferable.

Even more preferably, the numerical range of the Conditional Expression (4) may be set as follows:

$$1.6 < f2/fw < 2.0 \quad (4a)$$

When DL1 represents the distance from the object-side vertex of the lens of the first lens unit L1 that is arranged closest to the object side to the image-side vertex of the lens of the first lens unit L1 that is arranged closest to the image side, DL2 represents the distance from the object-side vertex of the lens of the second lens unit L2 that is arranged closest to the object side to the image-side vertex of the lens of the second lens unit L2 that is arranged closest to the image side, DL3 represents the distance from the object-side vertex of the lens of the third lens unit L3 that is arranged closest to the object side to the image-side vertex of the lens of the third lens unit L3 that is arranged closest to the image side, and fw represents the focal length of the entire system at the wide-angle end, then the following conditional expression is satisfied:

$$1.5 < (DL1+DL2+DL3)/fw < 2.5 \quad (5)$$

If (DL1+DL2+DL3)/fw is greater than the upper limit in Conditional Expression (5), then the lenses become relatively thick, and it becomes difficult to shorten the overall length of the lens system in the collapsed state, and is therefore not preferable.

If (DL1+DL2+DL3)/fw is smaller than the lower limit of the Equation (5), then the lenses become relatively thin and the overall length of the lens system in the collapsed state can be shortened, but the lenses must be provided with weak curvature in order to make the lenses thin, so that the focal length of the lens units becomes long. When the focal length of the lens units becomes long, then the movement amount of the lens units in the course of zooming inevitably becomes large, so that the cam cylinder moving the lens units becomes long, and the total length of the lens system in the collapsed state becomes long even though the lenses are thin, which is not preferable.

Even more preferably, the numerical range of the Conditional Expression (5) may be set as follows:

$$1.6 < (DL1+DL2+DL3)/fw < 2.3 \quad (5a)$$

By setting each of the elements in the present embodiments in the manner described above, a zoom lens is achieved, which is compact with few constituent lenses, as is preferable for image-taking systems using a solid-state image-pickup element, which is suitable in particular for collapsible zoom lenses, and which has the superior optical performance of a zoom ratio of 2× to 3×.

Moreover, with the present embodiments, off-axis aberrations, in particular astigmatism and distortion aberration, as well as spherical aberrations brought about by larger aperture ratios are effectively corrected by efficiently introducing aspheric surfaces into the lens units and setting the refractive power particularly of the first lens unit and the second lens unit to suitable values.

Moreover, with the present embodiments, it is possible to obtain a zoom lens that satisfies at least one of the following characteristics:

high performance and more compact, while having a larger field angle at the wide-angle end;

astigmatism and distortion aberration corrected in particular on the wide-angle side;

larger aperture ratio, which is suitable for image-pickup elements with high pixel density, which have low sensitivity;

favorable telecentric image formation on the image side, which is suitable for image-taking systems using solid-state image-pickup elements, while minimizing the number of constituent lenses;

distortion aberration favorably corrected not only at the wide-angle end but over the entire zoom region;

little variations of image-side telecentric image formation due to zooming;

movement amount of zoom lens units reduced while maintaining telecentric image formation, and more compact overall lens system;

mechanism for focusing on close-distance objects simplified.

The following is a description of Numerical Examples 1 to 3, which correspond to Embodiments 1 to 3, respectively. In these Numerical Examples, i represents the order of an optical surface from the object side, ri represents the curvature radius of an i-th optical surface, di represents the member thickness or the air distance between the i-th and the (i+1)th surface, and ni and υi represent, respectively, the refractive index and the Abbe number of the material of an i-th optical member for the d-line. The two surfaces closest to the image side are the surfaces of a glass block G corresponding to a quartz low-pass filter, an infrared cut filter, or the like. The aspheric surface shape can be expressed as $$X = \frac{(1/R)H^2}{1+\sqrt{1-(1+K)(H/R)^2}} + BH^4 + CH^6 + DH^8$$

wherein X is the displacement in the direction of the optical axis at a height H from the optical axis, taking the vertex of the surface as a reference, R represents the curvature radius, K represents conic constant, and B, C and D represent aspheric coefficients of the order 4, 6 and 8, respectively.

In the Numerical Examples, "D±0X" means "×10$^{±x}$", f represents the focal length, Fno represents the F number and ω represents the half field angle.

Table 1 shows numerical values calculated with the aforementioned conditional expression in the respective Numerical Examples.

NUMERICAL EXAMPLE 1

| f = 7.81~23.40 Fno = 1:2.7~5.0 2ω = 59.2°~21.5° | | | |
|---|---|---|---|
| r1 = 76.198 | d1 = 1.60 | n1 = 1.67790 | ν1 = 55.3 |
| r2 = 5.982 | d2 = 2.36 | | |
| r3 = 9.877 | d3 = 2.00 | n2 = 1.76182 | ν2 = 26.5 |
| r4 = 19.324 | d4 = Variable | | |
| r5 = (Aperture Stop) | d5 = 0.80 | | |
| r6 = 5.586 | d6 = 2.60 | n3 = 1.79952 | ν3 = 42.2 |
| r7 = 34.673 | d7 = 0.60 | n4 = 1.80518 | ν4 = 25.4 |
| r8 = 4.891 | d8 = 0.97 | | |
| r9 = 20.557 | d9 = 1.80 | n5 = 1.67790 | ν5 = 55.3 |
| r10 = −20.202 | d10 = Variable | | |
| r11 = 18.456 | d11 = 2.00 | n6 = 1.48749 | ν6 = 70.2 |
| r12 = −77.864 | d12 = Variable | | |
| r13 = ∞ | d13 = 2.50 | n7 = 1.51633 | ν7 = 64.1 |
| r14 = ∞ | | | |

| Variable | Focal Length | | |
|---|---|---|---|
| Spacing | 7.81 | 15.10 | 23.40 |
| d4 | 17.15 | 6.50 | 2.06 |
| d10 | 7.28 | 17.69 | 27.24 |
| d12 | 4.75 | 2.96 | 2.03 |

| Aspheric Coefficient | | | | | |
|---|---|---|---|---|---|
| Surface No. | R | K | B | C | D |
| 2 | 5.98182D+00 | −1.21666D+00 | 3.53675D−04 | 2.28576D−06 | −2.46250D−08 |
| 6 | 5.58568D+00 | −2.72685D−01 | −5.69472D−05 | | |

NUMERICAL EXAMPLE 2

| f = 5.23~11.49 Fno = 1:2.7~4.0 2ω = 64.1°~31.8° | | | |
|---|---|---|---|
| r1 = 26.604 | d1 = 1.20 | n1 = 1.69350 | ν1 = 53.2 |
| r2 = 3.586 | d2 = 1.54 | | |
| r3 = 5.990 | d3 = 2.00 | n2 = 1.76182 | ν2 = 26.5 |
| r4 = 11.113 | d4 = Variable | | |
| r5 = (Aperture Stop) | d5 = 0.50 | | |
| r6 = 3.336 | d6 = 2.00 | n3 = 1.58913 | ν3 = 61.3 |
| r7 = 7.475 | d7 = 0.50 | n4 = 1.76182 | ν4 = 26.5 |
| r8 = 3.165 | d8 = 0.55 | | |
| r9 = 6.999 | d9 = 1.60 | n5 = 1.60311 | ν5 = 60.6 |
| r10 = −11.947 | d10 = Variable | | |
| r11 = 20.535 | d11 = 1.50 | n6 = 1.48749 | ν6 = 70.2 |
| r12 = −125.155 | d12 = Variable | | |
| r13 = ∞ | d13 = 2.70 | n7 = 1.51633 | ν7 = 64.2 |
| r14 = ∞ | | | |

| Variable | Focal Length | | |
|---|---|---|---|
| Spacing | 5.23 | 8.15 | 11.49 |
| d4 | 9.35 | 4.51 | 1.69 |
| d10 | 2.07 | 6.69 | 10.24 |
| d12 | 3.27 | 1.84 | 1.48 |

| Aspherical Coefficient | | | | | |
|---|---|---|---|---|---|
| Surface No. | R | K | B | C | D |
| 2 | 3.58622D+00 | −8.23542D−01 | 6.58857D−04 | 2.14593D−05 | 7.90153D−08 |
| 6 | 3.33609D+00 | −3.48751D−01 | −3.90199D−04 | | |

NUMERICAL EXAMPLE 3

| f = 7.81~23.40 Fno = 1:2.7~5.0 2ω = 59.2°~21.5° | | | |
|---|---|---|---|
| r1 = 52.542 | d1 = 1.50 | n1 = 1.67790 | ν1 = 55.3 |
| r2 = 5.272 | d2 = 1.82 | | |
| r3 = 8.506 | d3 = 2.20 | n2 = 1.69895 | ν2 = 30.1 |
| r4 = 20.392 | d4 = Variable | | |
| r5 = (Aperture Stop) | d5 = 0.80 | | |
| r6 = 5.699 | d6 = 2.60 | n3 = 1.80610 | ν3 = 40.7 |
| r7 = 33.105 | d7 = 0.60 | n4 = 1.80518 | ν4 = 25.4 |
| r8 = 4.957 | d8 = 0.90 | | |
| r9 = 17.710 | d9 = 1.80 | n5 = 1.65160 | ν5 = 58.5 |
| r10 = −20.404 | d10 = Variable | | |
| r11 = 13.490 | d11 = 1.80 | n6 = 1.48749 | ν6 = 70.2 |
| r12 = 165.216 | d12 = Variable | | |
| r13 = ∞ | d13 = 2.50 | n7 = 1.51633 | ν7 = 64.1 |
| r14 = ∞ | | | |

| Variable Spacing | Focal Length | | |
|---|---|---|---|
| | 7.81 | 15.15 | 23.40 |
| d4 | 16.84 | 5.83 | 2.04 |
| d10 | 7.61 | 16.91 | 27.20 |
| d12 | 4.39 | 3.71 | 2.04 |

| Aspherical Coefficient | | | | | |
|---|---|---|---|---|---|
| Surface No. | R | K | B | C | D |
| 2 | 5.27191D+00 | −1.98991D+00 | 1.18431D−03 | −8.37667D−06 | 1.06596D−07 |
| 6 | 5.69916D+00 | −2.80267D−01 | −3.83945D−05 | | |

TABLE 1

| | | Upper limit | Lower limit | Embodiment 1 | Embodiment 2 | Embodiment 3 |
|---|---|---|---|---|---|---|
| Conditional Expression (1) | n1n | 1.60 | 1.75 | 1.67790 | 1.69350 | 1.67790 |
| Conditional Expression (2) | n1p | 1.65 | 1.80 | 1.76182 | 1.76182 | 1.69895 |
| Conditional Expression (3) | f1 | | | −17.47 | −10.88 | −17.36 |
| | fw | | | 7.81 | 5.23 | 7.81 |
| | f1/fw | −2.7 | −1.6 | −2.24 | −2.08 | −2.22 |
| Conditional Expression (4) | f2 | | | 14.88 | 8.8 | 14.63 |
| | fw | | | 7.808 | 5.231 | 7.807 |
| | f2/fw | 1.5 | 2.2 | 1.91 | 1.68 | 1.87 |
| Conditional Expression (5) | DL1 + DL2 + DL3 | | | 13.93 | 11.39 | 13.22 |
| | fw | | | 7.81 | 5.23 | 7.81 |
| | (DL1 + DL2 + DL3)/fw | 1.5 | 2.5 | 1.78 | 2.18 | 1.69 |

Figure 13:
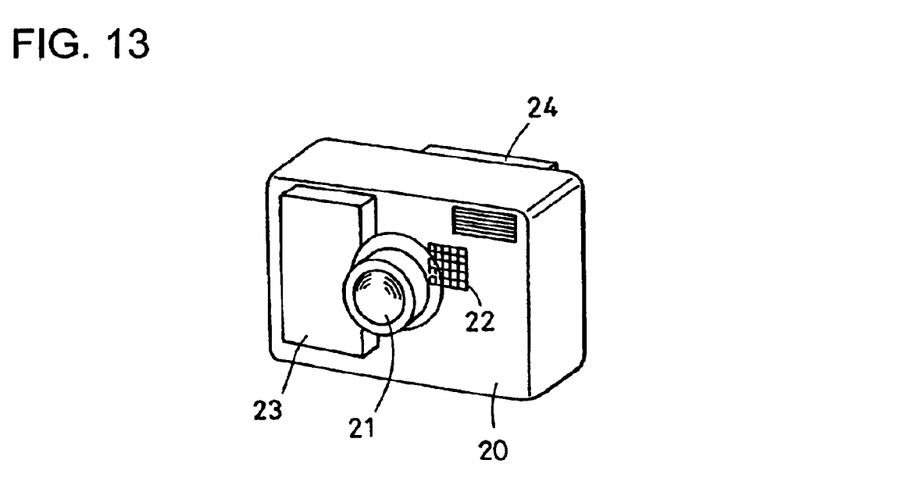
FIG. 13 is a schematic view of a digital still camera.

Referring to FIG. 13, the following is a description of an embodiment of a digital still camera using a zoom lens as described in Embodiments 1 to 3 as the image-taking optical system.

In FIG. 13, reference numeral 20 denotes a camera body, reference numeral 21 denotes an image-taking optical system including any of the zoom lenses explained by Embodiments 1 to 3, reference numeral 22 denotes a solid-state image-pickup element (photoelectric conversion element), such as a CCD sensor or a CMOS sensor, which is built into the camera body 20 and receives the object image formed by the image-taking optical system 21, reference numeral 23 denotes a memory, which stores information corresponding to the object image which has been photoelectrically converted by the solid-state image-pickup element 22, and reference numeral 24 denotes a viewfinder made of a liquid crystal display panel or the like for observing the object image formed on the solid-state image-pickup element 22.

Applying the zoom lens of the present invention in this manner to an optical apparatus, such as a digital still camera, it is possible to realize an optical apparatus that is compact and has an excellent optical performance.

While preferred embodiments have been described, it is to be understood that modification and variation of the present invention may be made without departing from scope of the following claims.

What is claimed is:

1. A zoom lens system comprising in order from an object side to an image side:

a first lens unit having a negative optical power, the first lens unit consisting of a meniscus-shaped negative lens element whose convex surface faces the object side and a positive lens element;

a second lens unit having a positive optical power; and a third lens unit having a positive optical power, the third lens unit comprising a positive lens element having a convex surface on the object side;

wherein the zoom lens system performs zooming by changing a distance between the first lens unit and the second lens unit as well as a distance between the second lens unit and the third lens unit; and the following conditional expressions are satisfied:

$1.60 < n1n < 1.75$ $1.65 < n1p < 1.80$ where n1n represents a refractive index of a material of the negative lens element in the first lens unit, and n1p represents a refractive index of a material of the positive lens element in the first lens unit.

2. The zoom lens system according to claim 1,
wherein the second lens unit comprises two positive lens elements and at least one negative lens element; and
the two positive lens elements in the second lens unit are respectively arranged closest to the object side and closest to the image side of the second lens unit.

3. The zoom lens system according to claim 1,
wherein the second lens unit consists, in order from the object side to the image side, of a cemented lens in which a positive lens element and a negative lens are cemented together, and a positive lens element having convex lens surfaces on both sides.

4. The zoom lens system according to claim 1,
wherein, during zooming from a wide-angle end to a telephoto end, the first lens unit moves along a track which is convex toward the image side, the second lens unit moves monotonously to the object side, and the third lens unit moves to the image side.

5. The zoom lens system according to claim 1,
wherein the following conditional expression is satisfied:

$-2.7 < f1/fw < -1.6$ where f1 represents a focal length of the first lens unit, and fw represents a focal length of the entire system at a wide angle end.

6. The zoom lens system according to claim 1,
wherein the following conditional expression is satisfied:

$1.5 < f2/fw < 2.2$ where f2 represents a focal length of the second lens unit, and fw represents a focal length of the entire system at a wide-angle end.

7. The zoom lens system according to claim 1,
wherein the following conditional expression is satisfied:

$1.5 < (DL1+DL2+DL3)/fw < 2.5$ where DL1 represents a distance from an object-side vertex of a lens element of the first lens unit that is arranged closest to the object side to an image-side vertex of a lens element of the first lens unit that is arranged closest to the image side, DL2 represents a distance from an object-side vertex of a lens element of the second lens unit that is arranged closest to the object side to an image-side vertex of a lens element of the second lens unit that is arranged closest to the image side, DL3 represents a distance from an object-side vertex of a lens element of the third lens unit that is arranged closest to the object side to an image-side vertex of a lens element of the third lens unit that is arranged closest to the image side, and fw represents a focal length of the entire system at a wide-angle end.

8. The zoom lens system according to claim 1,
wherein at least one surface of the negative lens element in the first lens unit and a surface of the second lens unit that is closest to the object side are aspheric surfaces.

9. The zoom lens system according to claim 1,
wherein focusing from an object at infinity to an object at short distance is performed by moving the third lens unit to the object side.

10. The zoom lens system according to claim 1,
wherein the zoom lens system forms an image on a solid-state image-pickup element.

11. A camera comprising:
the zoom lens system according to claim 1; and
a solid-state image-pickup element which receives an image formed by the zoom lens system.

* * * * *

UNITED STATES PATENT AND TRADEMARK OFFICE
CERTIFICATE OF CORRECTION

PATENT NO. : 6,943,962 B2  
APPLICATION NO. : 10/839145  
DATED : September 13, 2005  
INVENTOR(S) : Makoto Sekita Page 1 of 1

It is certified that error appears in the above-identified patent and that said Letters Patent is hereby corrected as shown below:

In the Specification

Column 6, line 29 delete "nip" and insert therefore -- n1p --.

Signed and Sealed this

Fifth Day of February, 2008

JON W. DUDAS  
*Director of the United States Patent and Trademark Office*